3,336,404
SELECTIVE HYDROGENATION OF
CYCLOALKADIENES
Sterling F. Chappell III, Lake Charles, La., assignor to Columbian Carbon Company, New York, N.Y., a corporation of Delaware
No Drawing. Filed Feb. 9, 1965, Ser. No. 431,452
9 Claims. (Cl. 260—666)

This invention is concerned with a new and improved process for the selective hydrogenation of a cycloalkadiene to its corresponding cycloalkene.

More specifically, the process of the present invention is concerned with a catalytic process utilizing gaseous hydrogen as the hydrogenating agent, to selectively hydrogenate a cycloalkadiene corresponding to the empirical formula of $C_nR'R_{2n-5}$, wherein R is a member selected from the group consisting of hydrogen and lower alkyl, R' is a member selected from the group consisting of hydrogen, lower alkyl, and phenyl, and $n$ is an integer having a value of from 6 to 12, to its corresponding cycloalkene having the empirical formula of $C_nH_2R'R_{2n-5}$, wherein R, R' and $n$ have the values given above. The catalytic material used in this selective hydrogenation process is a dispersion of an alkali metal on an activated alumina support.

Prior art methods of selectively hydrogenating this type of compound have one disadvantage in that they are not truly selective to the cycloalkene compound, but rather produce mixtures of the cycloalkene and its corresponding cycloalkane. The process of this invention provides a truly selective process to the corresponding cycloalkene with yields of the cycloalkene being 80% and above for the majority of the cyclolakadienes used. Additionally, the subject process has considerable economic advantage over the prior art processes concerned with this type of hydrogenation which utilizes as the catalytic material, semi-precious metals, such as platinum and palladium deposited upon a support material. Even though these catalysts may be reused numerous times, they still must be recovered after they have lost their catalytic activity and reactivated. The catalytic material used in the present process due to its lesser initial cost, need not be recovered, after it has lost its catalytic activity. Also, when properly purified and dried reactants and diluents or solvents, if used, are employed, these alkali metal on activated alumina catalysts may be used for a multiplicity of batch-wise hydrogenations or have a long life when used in a fixed bed or other continuous process.

The cycloalkenes prepared by the subject process are particularly useful as intermediates for further synthetic work. Thus, for example, they may readily be converted by ozonization to their corresponding α,ω-dicarboxylic acid, these dicarboxylic acids may then be reacted with various polyamines to form the corresponding polyamide resins of great utility. The product cycloalkenes readily undergo other transformations, such as hydrolysis, halogenation, hydrohalogenation, epoxidation, etc. resulting in the formation of other useful products.

The cycloalkadienes which may be hydrogenated according to the process of the present invention correspond to the general empirical formula of $C_nR'R_{2n-5}$, wherein R is a member selected from the group consisting of hydrogen and lower alkyl, R' is a member selected from the group consisting of hydrogen, lower alkyl and phenyl, and $n$ is an integer having a value of from 6 to 12. Structurally, the cycloalkadienes correspond to the formula of

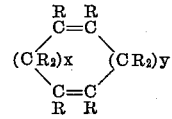

wherein R and R' have the meanings given above, and $x$ and $y$ are numbers, the sum of which is equal to $n-4$, and $n$, as above, is an integer having a value of from 6 to 12 inclusive.

The product cycloalkenes which are obtained by the subject hydrogenation process correspond to the general empirical formula of $C_nH_2R'R_{2n-5}$, wherein R, R' and $n$ have the values given above. In general, the product cycloalkene will correspond to the structural formula of

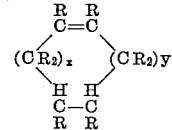

wherein R, R', $n$, $x$ and $y$ have the values given above.

In the above structural formulas, it is to be understood, that under certain circumstance, one of the R's may be replaced by a R'.

The term "lower alkyl" as used here and in the appended claims is used to designate an alkyl radical, either straight or branched chain having from one (1) to about five (5) carbon atoms.

The exact location of the hydrogen addition to the double bond will, of course, be guided by the relative reactivity of the two double bonds toward hydrogen addition, in accordance with well established principles of organic chemistry.

Thus, in accordance with the subject selective hydrogenation process, a 1,2-, a 1,3- or a 1,4-cyclohexadiene will be hydrogenated to a cyclohexene, a 1,2-, a 1,3- or a 1,4-cycloheptadiene will be hydrogenated to a cycloheptene, a 1,2-, a 1,3-, a 1,4- or a 1,5-cyclooctadiene will be hydrogenated to a cyclooctene, a 1,2-, a 1,3-, a 1,4-, a 1,5-, a 1,6- or a 1,7-cyclododecadiene will be hydrogenated to a cyclododecene a 1,2-, a 1,3-, a 1,4-, or a 1,5-cyclononadiene will hydrogenate to a cyclononene, a 1,2-, a 1,3-, a 1,4-, a 1,5- or a 1,6-cyclodecadiene will hydrogenate to a cyclodecene, and a 1,2-, a 1,3-, a 1,4-, a 1,5- or a 1,6-cycloundecadiene will hydrogenate to a cycloundecene.

A clearer understanding of the new selective hydrogenation process may be obtained from the examples given below which disclose the presently preferred modes of carrying out this invention.

EXAMPLE I

The catalyst was prepared by placing 42.5 grams of freshly dried Harshaw active alumina and 7.5 grams of metallic sodium in the hydrogenation bottle of a Parr hydrogenation apparatus. This mixture was heated to 140° C. under an atmosphere of argon and shaken. This approximate temperature and shaking was continued until the sodium appeared to be disposed upon the active alumina.

After preparation, the catalytic material was cooled to room temperature and 54 grams of 98% pure 1,3-cyclooctadiene was added to the reactor. This reaction mixture was agitated for approximately 61 hours at room temperature under a hydrogen pressure of approximately 80 pounds per square inch gauge (p.s.i.g.). At the end of this period, a sample of the reaction mixture was analyzed and found to contain the following components in the percentages indicated.

| | Percent |
|---|---|
| Cyclooctene | 95.3 |
| Cyclooctane | 1.2 |
| 1,3-cyclooctadiene | 1.2 |
| Other components | 1.2 |

EXAMPLE II

Following the general procedure of Example I, 50 grams of a dispersion of 15 percent sodium on activated alumina was added to 108 grams of 1,5-cyclooctadiene in the Parr hydrogenation bottle. The hydrogenation bottle was agitaated for 24 hours at a temperature of about 55° C., under a hydrogen pressure of from 50 to 70 p.s.i.g. At the end of this period, a sample of the reaction mixture was analyzed and found to contain the following components in the percentages indicated:

| | Percent |
|---|---|
| Cyclooctene | 93.2 |
| Cyclooctane | 5.2 |
| 1,4-cyclooctadiene | 0.9 |
| Other components | 0.65 |

EXAMPLE III

Use of 1,5-cyclodecadiene in the process of Example I will result in the formation of substantial quantities of cyclodecene.

EXAMPLE IV

Substitution of 1,5-dimethyl-1,5-cyclooctadiene for the 1,5-cyclooctadiene in the process of Example I, will yield considerable quantities of 1,5-dimethylcyclooctene.

EXAMPLE V

When the 1,5-cyclooctadiene of Example I is replaced by 1,5-dimethyl-1,5-cyclododecadiene or 1,2,5,6-tetramethyl-1,5-cyclododecadiene, a good yield of 1,5-dimethylcyclododecene or 1,2,5,6-tetramethylcyclododecene, respectively will be obtained.

Substitution of the following cycloalkadienes; 1,2,4,4,6,6-hexamethyl-1,2-cyclohexadiene; 2,4,6-triethyl-1,4-cyclohexadiene; 1,2,3,4-tetraethyl-1,3-cyclononadiene; 1,2-dimethyl-1,4-cyclononadiene; 1-methyl-1,4-cycloundecadiene; 1,4-cycloheptadiene; 1,2,3,4,5,6,7,7,8,8-decabutyl-1,5-cyclooctadiene; 1,2,3,4,5,6,7,8-octamethyl-1,4-cyclooctadiene 1-phenyl-3,7-cyclodecadiene or 1,2,3,3,4,5,6,7,8-nonapropyl-1,5-cyclooctadiene for the 1,5-cyclooctadiene of Example I will yield, respectfully, substantial quantities of 1,2,4,4,6,6-hexamethylcyclohexene, 2,4,6-trimethylcyclohexene, 1,2,3,4-tetraethylcyclononene, 1,2-dimethylcyclononene, 1-methylcycloundecene, cycloheptene, 1,2,3,4,5,6,7,7,8,8-decabutylcyclooctene 1,2,3,4,5,6,7,8-octamethylcyclooctene 1-phenyl-3-cyclodecene, and 1,2,3,3,4,5,6,7,8-nonapropylcyclooctene.

The alkali metals, which after being suitably dispersed upon on activated alumina support material, that are utilizable as catalytic materials in the subject selective hydrogenation process are selected from the group consisting of lithium, sodium, potassium, rubidium and cesium or mixtures thereof. Of these alkali metals, the more plentiful and less expensive metallic sodium and potassium, either alone or in admixture with one another, are preferred. As is discussed more fully below, these alkali metals are dispersed upon an activated alumina support material within the range of from about two (2) percent by weight to about thirty (30) percent by weight. The preferred range of alkali metal on the support materials is from about fifteen (15) percent to about twenty (20) percent.

As is well known, the alkali metals react violently with water and thus care must be taken to utilize a support which is relatively or substantially free from water. In most cases this freedom from water of the support material is achieved by precalcination of the support material. The actual conditions of the precalcination will be dependent upon the particular support material and, also, be dependent upon whether or not the water is in the combined or merely physically adsorbed upon the support material.

In addition to the necessity for freedom from water, the support material is additionally characterized by the necessity for having a high surface area. The term high surface area is used to designate a surface area measured by adsorption techniques within the range of from about 25 to about 400 or more square meters per gram. For example, it has been found that certain low surface area supports, such as alpha-alumina, which is obviously free from combined water and which has been freed from absorbed water, is not a particularly satisfactory support material for the alkali metals to be used as the catalytic material for the subject selective hydrogenation process. Alpha-alumina is usually characterized by a surface area ranging from about 10 to about 25 square meters per gram. However, gamma-alumina which has a surface area of from about 100 to about 300 square meters per gram and which has been suitably freed from absorbed and combined water, is an excellent support material for the alkali metal catalytic material for the subject selective hydrogenation process. In general, the support material should have the characteristics of, in addition to being inert and providing suitable physical support, freedom from combined or absorbed water and the desirable surface area requirements. The average pore radius of these aluminas will range from about 10 A. to about 1000 A., usually in the order of about 25 A. "A." is used to designate angstrom units.

The term "activated alumina" as used herein and the appended claims is used to define those "gamma-aluminas" or "transition aluminas" having a large surface area, very fine pores and are similar to the adsorbent aluminas. These activated transition or gamma aluminas are well known compounds and may be prepared by a variety of methods. Generalized preparative methods as well as references to special preparative methods may be found in standard reference works, such as Kirk-Othmer, Encyclopedia of Chemical Technology (2nd ed.) Volume 2, pages 42–58. Nomenclature as to the various quasi-anhydrous and anhydrous aluminas is discussed in these works.

In general, a suitable activated alumina for use as a support material in the subject process may be obtained by progressively dehydrating in air, the various hydrated forms of alumina, such as alpha-alumina trihydrate or gibbute, alpha alumina monohydrate or bohmite and beta-alumina trihydrate. Thus, for example, drying of alpha-alumina trihydrate in air in the range of 300–400° C. will give chi ($\chi$) alumina having a surface area of approximately 400–450 square meters per gram and the drying of beta-alumina trihydrate in air in the range of 300–400° C. will give eta ($\eta$) alumina having a surface area in the range of approximately 400–450 square meter per gram. The chi ($\chi$) and eta ($\eta$) forms of alumina and mixtures of these are the essential constituents of many activated aluminas. A particularly useful form of activated alumina for the support material is prepared by drying gamma alumina near 300° C., preferably in the range of from about 280° C. to about 320° C. Useful support material may also be obtained by air drying naturally occurring alumina mateiral, such as bauxite and bohmite. Due to their low surface areas the other crystalline modifications of the transition aluminas, i.e. rho ($\rho$), kappa ($\kappa$), theta ($\theta$) and delta ($\delta$) are not particularly useful as support material.

The dispersion of the alkali metal on the adsorbent supporting material can be effected by any of the known prior art methods of preparing this type catalytic material. One method of preparing this dispersion of alkali metal on the adsorbent support material may be effected by melting the alkali metal on the heated adsorbent support material employed in the form of a powder, in the presence of a fluidizing stream of an inert gas, such as helium or argon, which serves to maintain the supporting adsorbent particles in the form of an agitated or fluidized bed. Another method of dispersing the alkali metal onto the adsorbent supporting material is to use conventional mixing techniques to agitate the heated support material and the molten alkali metal. A third technique involves contacting a dispersion of the alkali metal in a hydrocarbon medium with particles of the adsorbent support material. There are other methods which may be used to prepare the dispersion on the solid support, such as by the adsorption of sodium from an ammoniacal solution onto the activated alumina. These dispersion processes readily form a dispersion of colloidal particles of about 0.5 to about 100 millimicrons of the alkali metal on the activated alumina support.

The catalytic material of this invention is, of course, partially or wholly deactivated by oxygen, moisture, carbon dioxide, various nitrogen compounds and certain sulfur compounds. Consequently, contact of the catalytic material or component with air, moisture, or other noxious materials should be minimized or avoided during the preparation of the catalytic material and the use thereof in the selective hydrogenation process. Before use in the catalyst preparation, it is desirable to throughly dry and possibly to evacuate the adsorbent alumina-containing materials. The catalyst composite may be diluted with inert solid materials which have no deleterious effect upon the selective hydrogenation reaction in order to modify the catalytic activity, if desired. The catalyst can be employed in various forms and sizes, such as, powder, granules, microspheres, broken filter cake, lumps, and shaped pellets.

The cycloalkadiene to be selectively hydrogenated should be relatively pure, although it may contain very small amounts of impurities inherently present in these types of compounds. When the cycloalkadienes contain significant amounts of materials which will react with the alkali metal catalyst and thereby inactivate these catalysts, the cycloalkadienes should be pretreated to remove these impurities before being contacted with the catalytic material. Thus, impurities such as acetylenes, sulfur, oxygen, water, carbon dioxide and phenols, should be removed or reduced in quantity, for instance to below ten parts per million before the cycloalkadiene is contacted with the alkali metal catalyst. These impurities may be removed or reduced by pretreating the cycloalkadienes with materials such as, an alkyl aluminum, silica gel, alumina, molecular sieves, calcium sulfate, sodium hydroxide, calcium hydride and alkali metals.

A solvent or inert diluent may be used in the subject process, if desired. Usually, the quantities of cycloalkadiene employed are such that there is no particular need for additional solvent or diluent. If an inert diluent or solvent is used, it may be employed in proportions up to about 200 volume percent based upon the volume of cycloalkadiene used. The inert diluent used is preferably an inert liquid hydrocarbon preferably having a boiling range outside of the boiling range of either the reactant cycloalkadiene or the product cycloalkene, so that the product may be readily separated from the diluent by distillation of the mixture produced by the selective hydrogenation. Suitable diluents include, n-pentane, n-hexane, isooctane, benzene, toluene and the like.

When a fixed bed process is used, except when a solvent or diluent is present, no particular separation and recovery means need be used, except to separate the unreacted cycloalkadiene, if necessary. When used, the diluent may conveniently be separated from the product by means of its difference in its boiling point from the product. In a batch process, the catalyst is preferably separated from the organic reaction mixture by means of a settling tank, filter, centrifuge or the like and then returned to the reactor for reuse.

The concentration of catalytic material, i.e. alkali metal and activated alumina support, in the reaction mixture is not highly critical and is principally dependent upon the rate of hydrogenation desired and the economics of the process. Generally any concentration of catalytic material in the range of one (1) to one hundred (100) percent by weight or more may be used. In a batch process any amount of catalytic material which can conveniently be stirred is operable. This type of catalytic material is readily adapted for usage in a fixed bed process.

In general, reaction temperatures in the range of from about 0° C. to about 200° C. may be used, preferably a reaction temperature of from about 75° C. to about 150° C. is used. Of course, the exact reaction temperature range to be used is dependent upon other factors, such as the reactivity of the reactants, concentration of catalytic material, and hydrogen pressure.

The pressure of hydrogen used is variable and, in general, pressures up to 500 p.s.i.g. (pounds per square inch gauge) may be used. Of course, usage of high pressures will increase the likelihood of producing more of the corresponding completely saturated cycloalkane. Preferably, hydrogen pressures in the range of from about fifty (50) to about two hundred and fifty (250) p.s.i.g. are used. However, again, the exact pressure to be used is dependent, principally upon factors as the reactivity of the reactants and products, catalytic material concentration and reaction temperature.

I claim:

1. A process for the selective hydrogenation of a cycloalkadiene corresponding to the empirical formula of $C_nR'R_{2n-5}$ wherein R is a member selected from the group consisting of hydrogen and (lower) alkyl radicals R' is a member selected from the group consisting of hydrogen, (lower) alkyl and phenyl, and $n$ is an integer having a value from 6 to 12, to its corresponding cycloalkene corresponding to the empirical formula of $C_nH_2R'R_{2n-5}$, wherein R, R' and $n$ have the values given above, which comprises the steps of (1) contacting the cycloalkadiene with hydrogen, under a positive pressure of hydrogen of up to about 500 p.s.i.g., and a catalytic material consisting essentially of an alkali metal dispersed on an activated alumina support, the support having a surface area in the range of from about 25 to 400 sq. meters per gram, at a reaction temperature in the range of from about 0° C. to 200° C., and for a period of time sufficient to effect the reaction between the hydrogen and the cycloalkadiene in about a mole for mole ratio, whereby a reaction product of predominantly the corresponding cycloalkene is formed; and (2) recovering the said cycloalkene product.

2. The process of claim 1, wherein the cycloalkadiene is a cyclooctadiene and the cycloalkene product is a cyclooctene.

3. The process of claim 1, wherein the cycloalkadiene is a cyclododecadiene and the cycloalkene product is a cyclododecene.

4. The process of claim 1, wherein the cycloalkadiene is a cyclodecadiene and the cycloalkene product is a cyclodecene.

5. The process of claim 1, wherein the cycloalkadiene is a cyclononadiene and the cycloalkene product is a cyclononene.

6. A process for the selective hydrogenation of a cycloalkadiene corresponding to the empirical formula of $C_nR'R_{2n-5}$, wherein R is a member selected from the group consisting of hydrogen and (lower) alkyl radicals, R' is a member selected from the group consisting of hydrogen, (lower) alkyl and phenyl, and $n$ is an integer having a value of from 6 to 12, to its corresponding cycloalkene corresponding to the empirical formula of $$C_nH_2R'R_{2n-5}$$

wherein R, R' and $n$ have the values given above, which comprises the steps of (1) contacting the cycloalkadiene with hydrogen, under a positive pressure of hydrogen of up to about 500 p.s.i.g., and a catalytic material consisting essentially of metallic sodium dispersed on an activated alumina support, the support having a surface area in the range of from about 25 to 400 sq. meters per gram, at a reaction temperature in the range of from about 0° C. to 200° C., and for a period of time sufficient to effect the reaction between the hydrogen and the cycloalkadiene in about a mole for mole ratio, whereby a reaction product of predominantly the corresponding cycloalkene is formed; and (2) recovering the cycloalkene product.

7. A process for the selective hydrogenation of a cycloalkadiene corresponding to the empirical formula of $C_nR'R_{2n-5}$, wherein R is a member selected from the group consisting of hydrogen and (lower) alkyl radicals R' is a member selected from the group consisting of hydrogen, (lower) alkyl, and phenyl, and $n$ is an integer having a value of from 6 to 12, to its corresponding cycloalkene corresponding to the empirical formula of $$C_nH_2R'R_{2n-5}$$

wherein R, R' and $n$ have the values given above, which comprises the steps of (1) contacting the cycloalkadiene with hydrogen, under a positive pressure of hydrogen of up to about 500 p.s.i.g., and a catalytic material consisting essentially of metallic potassium dispersed on an activated alumina support, the support having a surface area in the range of from about 25 to 400 sq. meters per gram, at a reaction temperature in the range of from about 0° C. to 200° C., and for a period of time sufficient to effect the reaction between the hydrogen and the cycloalkadiene in about a mole for mole ratio, whereby a reaction product of predominantly the corresponding cycloalkene is formed; and (2) recovering the said cycloalkene.

8. The process of claim 1, wherein the amount of alkali metal dispersed upon the activated alumina support is within the range of from about two (2) percent by weight to about thirty (30) percent by weight.

9. A process for the selective hydrogenation of 1,5-cyclooctadiene to cyclooctene which comprises the steps of (1) contacting the 1,5-cyclooctadiene with hydrogen, under a positive pressure of from about 50 to 250 p.s.i.g., and a catalytic material consisting essentially of metallic sodium dispersed on an activated alumina support, the amount of sodium being dispersed upon the support being within the range of from about 2 percent by weight to 30 percent by weight and the support having a surface area in the range of from about 25 to 400 sq. meters per gram, at a reaction temperature in the range of from about 20° C. to 150° C., and for a period of time sufficient to effect the reaction between the hydrogen and the cyclooctadiene in about a mole for mole ratio, whereby a reaction product of predominately cyclooctene is formed; and (2) recovering the cyclooctene product.

References Cited

UNITED STATES PATENTS

| | | | |
|---|---|---|---|
| 2,182,242 | 12/1939 | Wooster | 260—666 |
| 2,360,555 | 10/1944 | Evans et al. | 260—666 |
| 2,432,843 | 12/1947 | Whitman | 260—666 |
| 3,122,593 | 2/1964 | Wilson | 260—667 |
| 3,285,783 | 11/1966 | Arrigo | 260—666 |
| 3,294,853 | 12/1966 | Arrigo | 260—666 |
| 3,294,854 | 12/1966 | Slaugh | 260—666 |
| 3,296,320 | 1/1967 | Arrigo | 260—666 |

DELBERT E. GANTZ, *Primary Examiner.*

V. O'KEEFE, *Assistant Examiner.*